United States Patent
Wang et al.

(10) Patent No.: US 8,976,686 B2
(45) Date of Patent: Mar. 10, 2015

(54) TCM PATH SEARCH METHOD, TCM PATH CREAETION METHOD, PATH SEARCH MANAGEMENT SYSTEM, AND PATH CREATION MANAGEMENT SYSTEM

(75) Inventors: Shujian Wang, Shenzhen (CN); Heng Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 706 days.

(21) Appl. No.: 12/959,104

(22) Filed: Dec. 2, 2010

(65) Prior Publication Data

US 2011/0076010 A1 Mar. 31, 2011

Related U.S. Application Data

(63) Continuation of application No. PCT/CN2009/071613, filed on Apr. 30, 2009.

(30) Foreign Application Priority Data

Jun. 2, 2008 (CN) .......................... 2008 1 0114289

(51) Int. Cl.
  *H04L 12/28* (2006.01)
  *H04L 12/26* (2006.01)
  (Continued)

(52) U.S. Cl.
  CPC ........... *H04J 3/1652* (2013.01); *H04L 41/0695* (2013.01); *H04L 43/12* (2013.01);
  (Continued)

(58) Field of Classification Search
  CPC ......... H04L 43/00; H04L 43/12; H04L 41/06; H04L 41/0695
  See application file for complete search history.

(56) References Cited

U.S. PATENT DOCUMENTS 7,143,161 B2  11/2006  Brissette
7,200,157 B1  4/2007  Hessler et al.
(Continued)

FOREIGN PATENT DOCUMENTS

CN  1592211 A  3/2005
CN  101009518 A  8/2007
(Continued)

OTHER PUBLICATIONS

Interfaces for the Optical Transport Network (OTN): Amendment 2, Series G: Transmission Systems and Media, Digital Systems and Networks. Digital terminal equipments—General, Series Y: Global Information Infrastructure, Internet Protocol Aspects and Next-Generation Networks. Internet protocol aspects—Transport. ITU-T Recommendation, G.709/Y.1331, Amendment 2, Nov. 2007.
(Continued)

*Primary Examiner* — Hassan Phillips
*Assistant Examiner* — Lonnie Sweet
(74) *Attorney, Agent, or Firm* — Brinks Gilson & Lione

(57) ABSTRACT

A Tandem connection monitoring (TCM) path search method, a TCM path creation method, a path search management system, and a path creation management system are provided. The source end TCM mode and the sink end TCM mode at a single level of each node in an Optical Channel Data Unit-k (ODUk) path are acquired; and a TCM path at the single level between nodes in the ODUk path is calculated according to the source end TCM mode and the sink end TCM mode at the single level of each node that are acquired. TCM level information and the sink end TCM mode of a second node for TCM path creation between a first node and the second node are acquired by specifying the first node and the second node; and a TCM path between the first node and the second node that are specified is created and stored.

9 Claims, 8 Drawing Sheets

(51) Int. Cl.

| | | |
|---|---|---|
| *H04L 12/16* | (2006.01) | |
| *H04L 1/00* | (2006.01) | |
| *H04J 3/16* | (2006.01) | |
| *H04L 12/721* | (2013.01) | |
| *H04Q 11/00* | (2006.01) | |
| *H04L 12/24* | (2006.01) | |

(52) U.S. Cl.
CPC ........ *H04L 43/00* (2013.01); *H04J 2203/0067* (2013.01); *H04L 41/5054* (2013.01); *H04L 41/5077* (2013.01); *H04L 45/12* (2013.01); *H04Q 11/0062* (2013.01); *H04Q 2011/0083* (2013.01)
USPC ........... 370/252; 370/241; 370/242; 370/243; 370/244; 370/245; 370/246; 370/247; 370/248; 370/249; 370/250; 370/251; 370/253; 370/400; 370/401; 398/58

(56) References Cited

U.S. PATENT DOCUMENTS

| | | | | |
|---|---|---|---|---|
| 8,169,917 | B2* | 5/2012 | Chun et al. | 370/241 |
| 2003/0097472 | A1* | 5/2003 | Brissette | 709/245 |
| 2003/0231638 | A1* | 12/2003 | Huck et al. | 370/400 |
| 2004/0184489 | A1* | 9/2004 | Brissette et al. | 370/907 |
| 2008/0044183 | A1* | 2/2008 | Perkins et al. | 398/58 |
| 2008/0279548 | A1 | 11/2008 | Yan | |
| 2009/0180774 | A1 | 7/2009 | Yan | |

FOREIGN PATENT DOCUMENTS

| | | |
|---|---|---|
| CN | 101009943 A | 8/2007 |
| CN | 101136700 A | 3/2008 |
| CN | 101154995 A | 4/2008 |
| EP | 0137288 A1 | 4/1985 |
| EP | 1 372 288 A1 | 12/2003 |
| EP | 2 037 628 A1 | 3/2009 |
| EP | 2 075 955 A1 | 7/2009 |
| RU | 2196387 C2 | 1/2003 |
| WO | WO 2005074355 A2 | 8/2005 |
| WO | WO 2008034339 A1 | 3/2008 |
| WO | WO 2009/146623 | 12/2009 |

OTHER PUBLICATIONS

Written Opinion of the International Searching Authority issued in corresponding PCT Patent Application No. PCT/CN2009/071958, mailed Sep. 3, 2009.

Extended European Search Report issued in corresponding European Patent Application No. 09757057.6, mailed Jun. 29, 2011.

International Telecommunication Union, "Interfaces for the Optical Transport Network (OTN)", Series G: Transmission Systems and Media, Digital Systems and Networks—Digital Terminal Equipments—General; Series Y: Global Information Infrastructure, Internet Protocol Aspects and Next Generation Networks—Internet Protocol Aspects—Transport. G.709/Y.1331, Mar. 2003.

ITU—Telecommunication Standardization Sector, "Draft New Recommendation G.798", D.58(WP3/15). Geneva, Feb. 5-9, 2011.

Office Action issued in corresponding Chinese Patent Application No. 200810114289.4, mailed Jul. 14, 2011.

Decision on Grant issued in corresponding Russian Patent Application No. 2010153988/07, mailed Oct. 5, 2012.

Characteristics of Optical Transport Network Hierarchy Equipment Functional Blocks ITU-T Draft Recommendation G.798, Issue 0.62. Geneva, Feb. 5-9, 2001.

* cited by examiner

TCM PATH SEARCH METHOD, TCM PATH CREAETION METHOD, PATH SEARCH MANAGEMENT SYSTEM, AND PATH CREATION MANAGEMENT SYSTEM

CROSS-REFERENCE TO RELATED APPLICATIONS

This application is a continuation of International Application No. PCT/CN2009/071613, filed on Apr. 30, 2009, which claims priority to Chinese Patent Application No. 200810114289.4, filed on Jun. 2, 2008, both of which are hereby incorporated by reference in their entireties.

FIELD OF THE TECHNOLOGY

The present invention relates to the field of communications technologies, and more particularly to a Tandem connection monitoring (TCM) path search method, a TCM path creation method, a path search management system, and a path creation management system.

BACKGROUND OF THE INVENTION

Many different network operators all over the world have their own laid fibers and network equipment which form multiple sub-networks. Inside their sub-networks, different network operators are solely responsible for management, maintenance, and fault location of the network equipment. However, in sequence to acquire broader coverage, network equipment of multiple different operators needs to be connected into a larger network to serve users. In this way, an end-to-end user service may be transported through sub-networks of different operators. In this case, a mechanism is required to distinguish quality conditions of sub-networks of different operators.

In order to evaluate quality conditions of sub-networks of different operators, the concept of TCM is proposed. The TCM can be used for evaluating quality conditions of sub-networks of different operators, realize sub-network monitoring, and is used for monitoring transmission quality conditions of an end-to-end service on corresponding transmission paths in different sub-networks.

The implementation principle of TCM is to define six levels of TCM overhead (OH) at an Optical Channel Data Unit (ODU) layer of an Optical Transport Network (OTN), that is, the number of TCM fields in each ODUk path may vary from 1 to 6, where k in the ODUk path represents a rate level, and k=1, 2, 3. When k is 1, it represents a rate of 2.5 Gbit/s; when k is 2, it represents a rate of 10 Gbit/s; and when k is 3, it represents a rate of 40 Gbit/s. Each leasing operator can independently accomplish real-time monitoring of an ODUk path connection state through TCM OH, and can monitor at most six levels of TCM simultaneously. In an ODUk path, OH is rewritten at a transmission source end, and extracted and monitored at a sink end, and corresponding defects are generated according to the OH. In this way, continuity monitoring, connectivity monitoring, and signal quality monitoring can be performed.

The connection of monitoring of a segment of an ODUk path through TCM OH may be nested, overlapped, and/or cascaded. FIGS. 1A and 1B are schematic views of two kinds of monitoring connection of an ODUk path. As shown in FIGS. 1A and 1B, a large sub-network exists between A1 and A2, A1 and A2 are boundaries of the sub-network, a customer service enters the sub-network from a node A1/A2, passes through the intermediate network, and leaves the sub-network from A2/A1. Meanwhile, the A1-A2 sub-network includes multiple sub-networks therein, for example, sub-networks between B1 and B2, between B3 and B4, and between C1 and C2 shown in FIG. 1A as well as sub-networks between B1 and B2 and between C1 and C2 shown in FIG. 1B. These sub-networks may be formed by the management of equipment of different equipment suppliers by the same operator or by the management of different equipment by different operators.

Currently, OH of each node in a TCM path is configured by the respective node, so that only its own OH information can be seen through the single node. When TCM OH needs to be configured, OH needs to be configured for each node first, and the user must know current OH configuration of all nodes well, so as to determine which level of TCM OH can be used to monitor a TCM segment and how to correctly configure the currently monitored TCM segment; otherwise, the original monitoring path may be destroyed due to wrong configuration. It can be seen that, no efficient TCM path management method is provided in the prior art.

SUMMARY OF THE INVENTION

The present invention is directed to a TCM path search method, a TCM path creation method, a path search management system, and a path creation management system, for realizing efficient management of a TCM path.

In an embodiment, the present invention provides a TCM path search method, which includes the following steps.

The source end TCM mode and the sink end TCM mode at a single level of each node in an ODUk path are acquired.

The TCM path at the single level between nodes in the ODUk path is calculated according to the source end TCM mode and sink end TCM mode at the single level of each node that are acquired.

In an embodiment, the present invention further provides a TCM path creation method, which includes the following steps.

The source end TCM mode and the sink end TCM mode of each node in an ODUk path are acquired.

TCM level information and the sink end TCM mode of a second node for TCM path creation between a first node and the second node are acquired according to a first node and a second node that are specified.

A TCM path between the first node and second node that are specified is created according to the TCM level information and the sink end TCM mode of the second node that are acquired.

In an embodiment, the present invention further provides a TCM path search management system, which includes a first acquisition module and a search module.

The first acquisition module is configured to acquire the source end TCM mode and the sink end TCM mode at a single level of each node in an ODUk path.

The search module is configured to calculate a TCM path between nodes in the ODUk path according to the source end TCM mode and the sink end TCM mode at the single level of each node that are acquired by the first acquisition module.

In an embodiment, the present invention further provides a TCM path creation management system, which includes a second acquisition module, a third acquisition module, and a creation module.

The second acquisition module is configured to acquire the source end TCM mode and the sink end TCM mode of each node in an ODUk path.

The third acquisition module is configured to acquire TCM level information and the sink end TCM mode of a second node for TCM path creation between a first node and the second node according to the first node and second node that are specified.

The creation module is configured to create, according to the TCM level information and the sink end TCM mode of the second node that are acquired, a TCM path between the first node and second node that are specified.

It can be known from the above technical solutions that, the TCM path search method, the TCM path creation method, the path search management system, and the path creation management system in the embodiments of the present invention can acquire a complete TCM path by performing TCM path search through TCM OH node information configured at a single station, so as to determine a currently monitored TCM segment, thereby realizing efficient path management in complex TCM paths that can be nested, overlapped and/or cascaded. TCM OH is configured for each single-station node through the path creation function, and the path creation can determine which level of TCM OH can be used to monitor a TCM segment for a first node and a second node that are specified and how to configure the TCM segment according to searched out path information, thereby providing reliable and efficient path management.

The present invention will be described in further detail below through specific embodiment with reference to the accompanying drawings.

DETAILED DESCRIPTION OF THE EMBODIMENTS

A TCM path search method is introduced in the embodiments of the present invention. The search for a TCM path described in the TCM path search method is performed based on an ODUk path that already exists; where k represents a rate level in the ODUk path. A TCM path may already exist in the ODUk path, or no TCM path exists in the ODUk path.

A TCM segment needs to perform function setting, that is, configuration of TCM OH, for each node using the TCM function. The setting includes setting of a TCM level and the TCM mode, and the setting may be performed for each node in the ODUk path in two directions respectively. The TCM level is one of the TCM field numbers 1-6. The TCM mode includes the OPERATIONAL mode, the MONITOR mode, and the TRANSPARENT mode.

Figure 2:
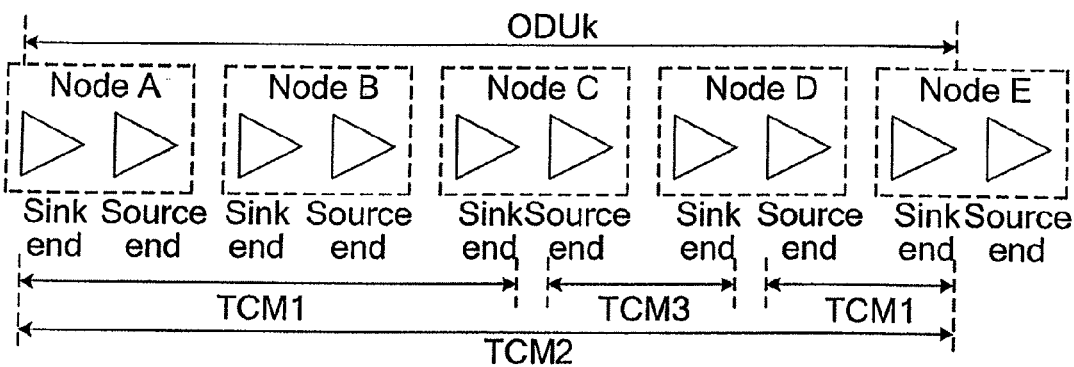
FIG. 2 is a schematic view of an ODUk path in the present invention.

FIG. 2 is a schematic view of an ODUk path in the present invention. As shown in FIG. 2, each node that the ODUk path passes through may be classified into a source and a sink according to the requirements for monitoring, and TCM OH is configured by setting TCM modes of the source and the sink, and monitoring of a TCM path is realized. The source and sink of each node have six levels of TCM OH, and the configuration and function realization of each level are completely independent. A complete TCM path in the ODUk path can be configured by configuring a source end of the first node (that is, a sending end) in the TCM path as the OPERATIONAL mode, a sink end of the last node (a receiving end) in the TCM path as the MONITOR mode or the OPERATIONAL mode, source ends of all intermediate nodes in the TCM path as the TRANSPARENT mode, and sink ends of all the intermediate nodes in the TCM path as the TRANSPARENT mode or the MONITOR mode. Specifically, as shown in FIG. 2, in the second-level TCM path, the TCM mode of a sending end, that is, a source end of node A, must be the OPERATIONAL mode, the TCM mode of a receiving end, that is, a sink end of node F, may be the MONITOR mode (which represents that the TCM path is not terminated) or the OPERATIONAL mode (which represents that the TCM path is terminated), the TCM mode of source ends of all intermediate nodes between node A and node F in the TCM path must be the TRANSPARENT mode, and the TCM mode of sink ends of all the intermediate nodes may be the TRANSPARENT mode or the MONITOR mode.

Figure 3:
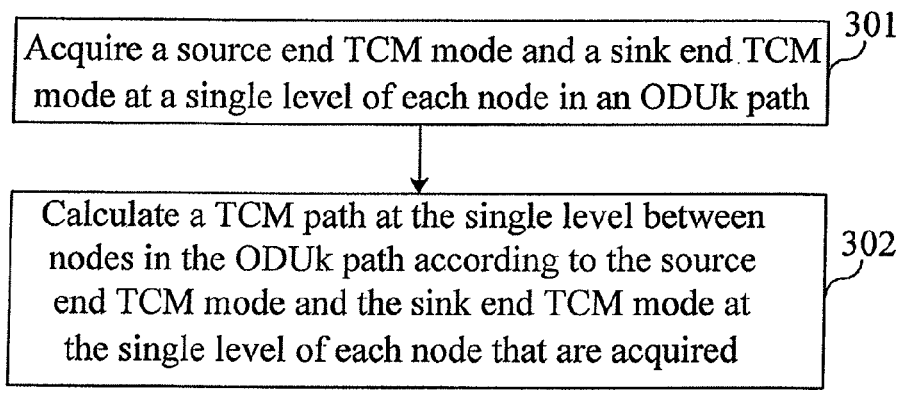
FIG. 3 is a schematic flow chart of a TCM path search method according to a first embodiment of the present invention.

FIG. 3 is a schematic flow chart of a TCM path search method according to a first embodiment of the present invention, which mainly includes the following steps.

In step 301, the source end TCM mode and the sink end TCM mode at a single level of each node in an ODUk path are acquired.

Information about source end TCM modes and sink end TCM modes of all nodes that the ODUk path passes through is stored in boards. When needing to know TCM modes of each node, network management equipment actively queries each board, so as to acquire the TCM mode information of the corresponding node through a corresponding interface provided by the board. The TCM mode information may be configured by configuring the source end TCM mode and the sink end TCM mode of a board at a single node respectively or configured by creating a TCM path. The method for creating the TCM path will be introduced specifically in the following embodiments.

In step 302, a TCM path at the single level between nodes in the ODUk path is calculated according to the source end TCM mode and the sink end TCM mode at the single level of each node that are acquired.

All nodes in the ODUk path are traversed according to a sequence of the nodes, and a sending end, a receiving end, and intermediate nodes of a TCM path can be searched out according to the source end TCM mode and the sink end TCM mode at the single level of each node that are acquired and stored, so as to calculate and acquire a TCM path at the single level between the nodes, thereby achieving the purpose of searching for a TCM path in the selected ODUk path.

In the TCM path search method provided in this embodiment, a complete TCM path can be calculated by performing TCM path search according to acquired TCM OH information configured for a single node, that is, information about the TCM mode and a TCM level, so as to determine a currently monitored TCM segment, thereby realizing efficient TCM path management in complex TCM paths that can be nested, overlapped and/or cascaded.

Figure 4:
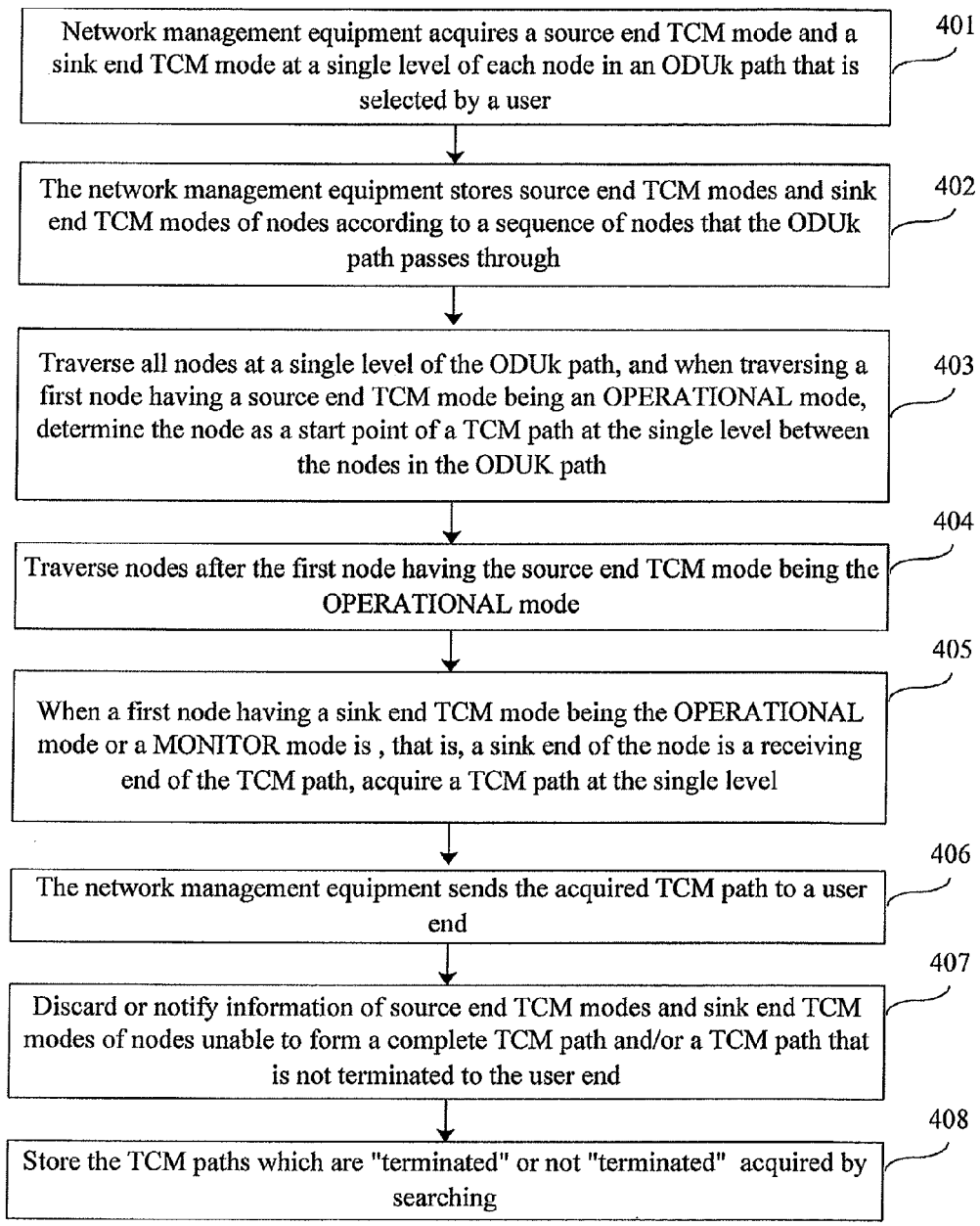
FIG. 4 is a schematic flow chart of a TCM path search method according to a second embodiment of the present invention.

FIG. 4 is a schematic flow chart of a TCM path search method according to a second embodiment of the present invention, which mainly includes the following steps.

A source end and a sink end of each node both have six levels of TCM field OH, that is, 1-6 levels of TCM. Since the configuration and function of the six levels of TCM field OH are completely independent, the TCM path search for each level may also be performed independently. For ease of description, this embodiment takes the search for a TCM path at a single level as an example, and the path search algorithm only needs to be repeated for each level of TCM in actual use.

In step 401, network management equipment acquires the source end TCM mode and the sink end TCM mode at a single level of each node in an ODUk path selected by a user.

In step 402, the network management equipment stores source end TCM modes and sink end TCM modes of nodes according to a sequence of the nodes that the ODUk path passes through.

Acquired TCM mode information of all nodes may be stored in the network management equipment according to a sequence of the nodes that the ODUk path passes through, for subsequent invocation. The source end TCM mode and the sink end TCM mode of the same node need to be stored respectively.

In step 403, the network management equipment traverses all nodes at a single level of the ODUk path according to the sequence of the nodes that the ODUk path passes through, and when traversing a first node whose source end TCM mode being the OPERATIONAL mode, determines the node as a start point of a TCM path at the single level between the nodes in the ODUK path.

Traverse is performed on all nodes of the ODUk in turn from the first node of the ODUk path, and when a first node whose source end TCM mode being the OPERATIONAL mode is met, a start point of a TCM path is found, that is, a source end of the node is a sending end of the TCM path. Further, in step 403, search may also be performed by invoking TCM mode information of nodes stored in the network management equipment in turn.

In step 404, the network management equipment continues to traverse nodes after the first node whose source end TCM mode being the OPERATIONAL mode according to the sequence of the nodes that the ODUk path passes through.

In step 405, when a first node whose sink end TCM mode being the OPERATIONAL mode or the MONITOR mode is traversed, that is, a sink end of the node is a receiving end of the TCM path, a TCM path at the single level between nodes in the ODUK path from the first node whose source end TCM mode being the OPERATIONAL mode to the first node whose sink end TCM mode being the MONITOR mode or the OPERATIONAL mode is acquired.

When a first node whose sink end TCM mode being the MONITOR mode, that is, the TCM path is a TCM path not terminated, traversal is continued on nodes in the selected ODUk path in sequence, and if a second node whose sink end TCM mode being the OPERATIONAL mode is met, it is considered that a complete TCM path is found, where the so-called complete TCM path may be considered as a "terminated" TCM path, and the searched out TCM path may be recorded. Besides, after the above complete TCM path, according to the TCM OH configuration and rules of a complete TCM path, if no node whose source end TCM mode being the OPERATIONAL mode is traversed, any of the following nodes thereof should not have the sink end TCM mode being the OPERATIONAL mode or the MONITOR mode. Further, if a node whose sink end TCM mode being the MONITOR mode is met, it is considered that a TCM path that is not "terminated" and can be used for monitoring is found, and the searched out path is recorded. However, in this case, the OH of the monitored TCM segment is not terminated, and search may be continued until the last node of the ODUk path. That is to say, multiple TCM paths may have overlapping parts and use the same level of TCM OH in this case.

In step 406, the network management equipment sends the acquired TCM path to a user end.

After the TCM path search is completed, a search result may be presented to the user in a visual manner, for example, with a graph.

In step 407, information of source end TCM modes and sink end TCM modes of nodes unable to form a complete TCM path and/or a TCM path that is not terminated is discarded or notified to the user end.

In step 408, the TCM paths which are "terminated" or not "terminated" that are acquired by search are stored.

By performing steps 401-408, the search for all TCM paths at one TCM level may be completed, and the search for TCM path information at other TCM levels may be continued by the same method subsequently.

In the TCM path search method provided in this embodiment, TCM path search is performed according to acquired TCM OH information of a single node, that is, information about a TCM mode and a TCM level, and a complete TCM path can be acquired through calculation according to TCM modes required for all nodes in a complete TCM path, so as to determine a currently monitored TCM segment, thereby realizing efficient TCM path management in complex TCM paths that can be nested, overlapped and/or cascaded, and avoiding unnecessary trouble caused by misoperation of the user.

Figure 5:
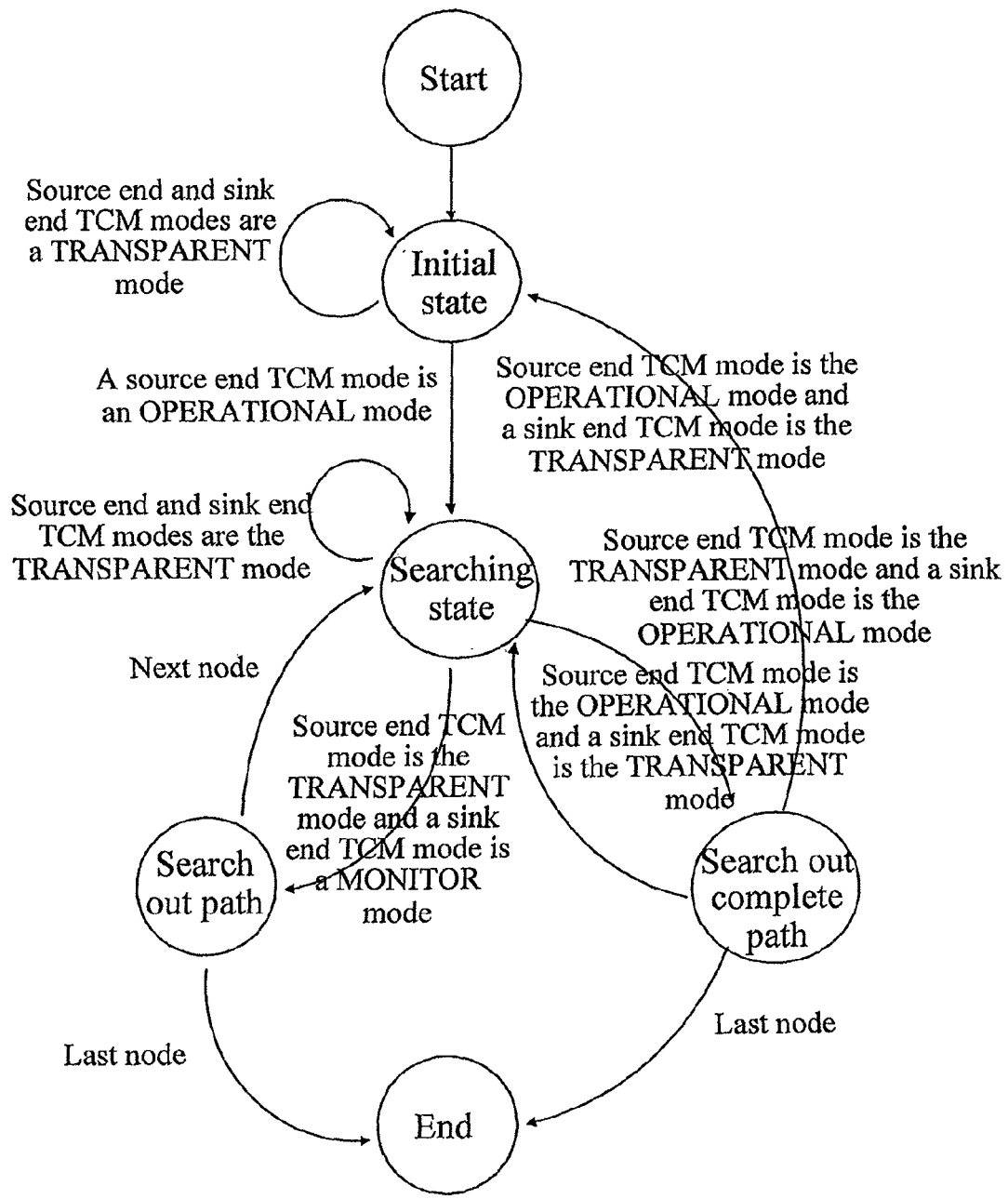
FIG. 5 is a schematic view of state transition of a TCM path search method according to a third embodiment of the present invention.

FIG. 5 is a schematic view of state transition of a TCM path search method according to a third embodiment of the present invention. FIG. 5 only marks transition relations of a normal path; in practice, some transitions not shown in FIG. 5 may occur due to the misoperation of the user end, and in this case, the TCM path is invalid. Besides, in FIG. 5, each circle denotes a state of TCM path search which may include initial, searching, searched out a path, searched out a complete path, and end states, the pointing direction of each arrow denotes transition between the states, and identifying information of each arrow denotes conditions required for state transition. FIG. 5 is described in detail below.

Figure 1A:
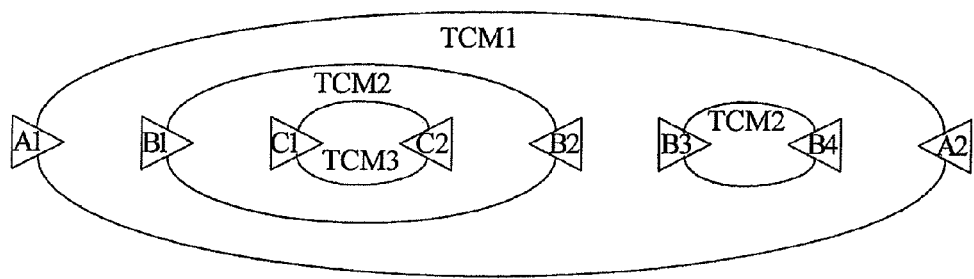
FIG. 1A is a schematic view of TCM monitoring connection of an ODUk path.

First, network management equipment acquires TCM modes at a single level of all nodes in an ODUk path, and stores them according to a sequence of traversing nodes. Then, the network management equipment traverses the nodes from the first node in the ODUk path according to a sequence of the nodes, and searches for and calculates a TCM path according to the TCM modes of the nodes. For example, as shown in FIG. 1A, the ODUk path has a total of 6 nodes, search is performed at the TCM2 level, if source end and sink end TCM modes of the first node A1 are both the TRANSPARENT mode, cycle is performed in an initial state, that is, no operation is performed on this node, and traversal is continued on a next node. When the second node B1 is traversed, and the source end TCM mode of B1 at the TCM2 level is the OPERATIONAL mode and the sink end TCM mode of B1 at the TCM2 level is the TRANSPARENT mode, a start point of a TCM path is found, a source end of the node B1 is a sending end, and at this time, the search enters a TCM path searching state. Subsequently, the third and fourth nodes are searched according to a sequence, at this time, source end and sink end TCM modes of the two nodes are both the TRANSPARENT mode, and then search is continued in the searching state. When the fifth node B2 is traversed, the source end TCM mode of the node is the TRANSPARENT mode and the sink end TCM mode of the node is the OPERATIONAL mode, then, it is considered that a complete TCM path is found, and a sink end of the node B2 is a receiving end. According to this condition, the state transits to a "searched out a complete path" state, and the searched out path can be recorded. Subsequently, a sending end of a new TCM path may be searched for, that is, traversal is continued on nodes in the ODUk path according to a sequence in the "searched out a complete path" state. If a subsequent node whose source end TCM mode being the OPERATIONAL mode and sink end TCM mode being the TRANSPARENT mode is searched out, the flow returns to the searching state and search is continued until a next node whose source end TCM mode being the TRANSPARENT mode and sink end TCM mode being the OPERATIONAL mode is searched out, and then a further complete TCM path is found, and the state transits to the "searched out a complete path" state again; if a subsequent node whose source end TCM mode being the TRANSPARENT mode and sink end TCM mode being the TRANSPARENT mode is searched out, the flow returns to the initial state, and the above search process is repeated; and if no subsequent node has the source end TCM mode being the OPERATIONAL mode, the TCM path search at this level ends.

Figure 1B:
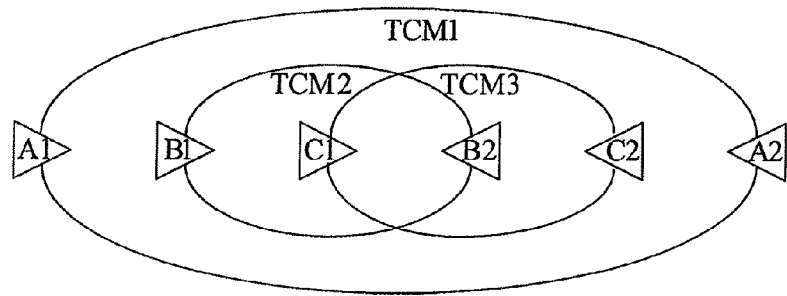
FIG. 1B is another schematic view of TCM monitoring connection of an ODUk path.

As shown in FIG. 1B, node traversal in the ODUk path before reaching the searching state is the same as the above process. Subsequently, search is continued for the third node C1. At this time, source end and sink end TCM modes of this node are both the TRANSPARENT mode, and then search is continued in the searching state. When the fourth node B2 is traversed, the source end TCM mode of this node is the TRANSPARENT mode and the sink end TCM mode of this node is the MONITOR mode, it is considered that a TCM path that is not terminated is found, the state transits to a "searched out a path" state, and the searched out path can be recorded. However, at this time, the OH of the monitored segment is not terminated, and the search needs to be continued subsequently, that is, no matter whether the source end TCM mode of the node next to the node B2 is the OPERATIONAL mode or the TRANSPARENT mode, the flow needs to return to the searching state to continue the search. Certainly, if node B2 is the last node, the search for the TCM path at this level ends. In the case of FIG. 1B, it indicates that multiple TCM paths exist at the TCM2 level and have overlapping parts.

In embodiments of the present invention, a TCM path creation method is further introduced. The TCM path creation described in the embodiments of the present invention is also performed based on an ODUk path that already exists. A TCM path may already exist or no TCM path exists in the ODUk path. Since a total of 6 levels of TCM OH fields exist, during the creation, prompt of TCM levels at which TCM OH is usable is given to the user for a start node and a termination node specified by the user, and a TCM path is created according to the start node and the termination node specified by the user.

Figure 6:
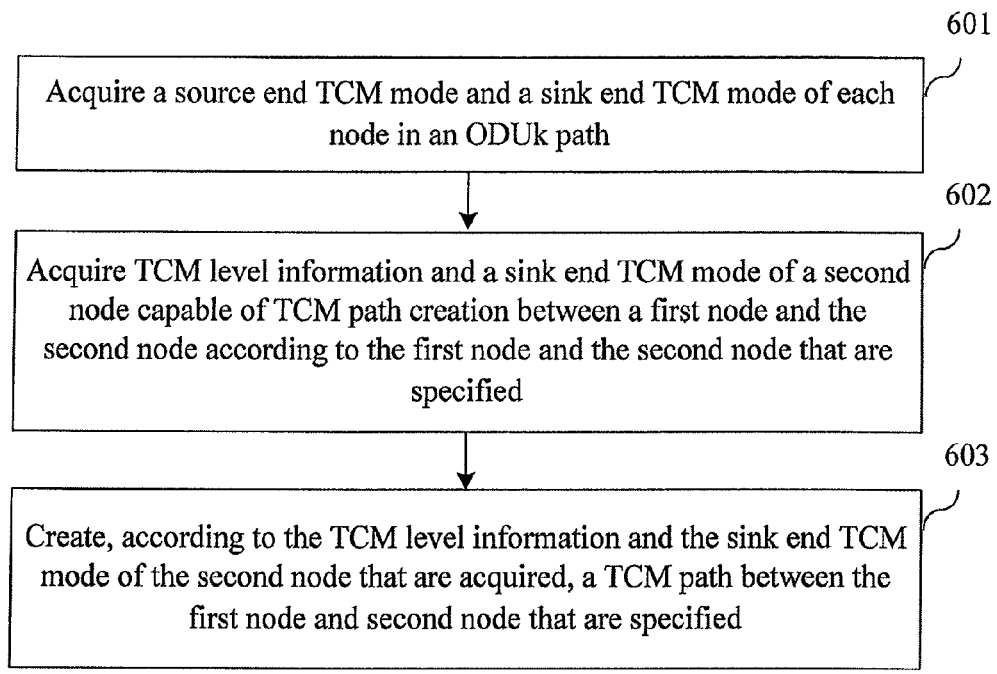
FIG. 6 is a schematic flow chart of a TCM path creation method according to a first embodiment of the present invention.

FIG. 6 is a schematic flow chart of a TCM path creation method according to a first embodiment of the present invention, which mainly includes the following steps.

In step 601, the source end TCM mode and the sink end TCM mode of each node in an ODUk path are acquired.

In step 602, TCM level information and the sink end TCM mode of a second node capable of TCM path creation between a first node and the second node are acquired according to the first node and the second node that are specified.

In step 603, a TCM path between the first node and second node that are specified is created according to the TCM level information and the sink end TCM mode of the second node that are acquired.

In the TCM path creation method provided in this embodiment, network management equipment automatically acquires TCM modes of each node in an ODUk path, and then calculates and acquires information of an available TCM level between a first node and a second node requiring creating a TCM path and the sink end TCM mode of the second node, and then a TCM path is created, so as to realize the function of efficient TCM path creation.

The TCM path creation provided in this embodiment is performed based on an ODUk path. TCM OH is configured for each node through the path creation function; and path creation can provide reliable and efficient path management for which level of TCM OH can be used to monitor a TCM segment for a first node and a second node that are specified and how to configure TCM modes of each node of the TCM segment according to searched out path information.

Figure 7:
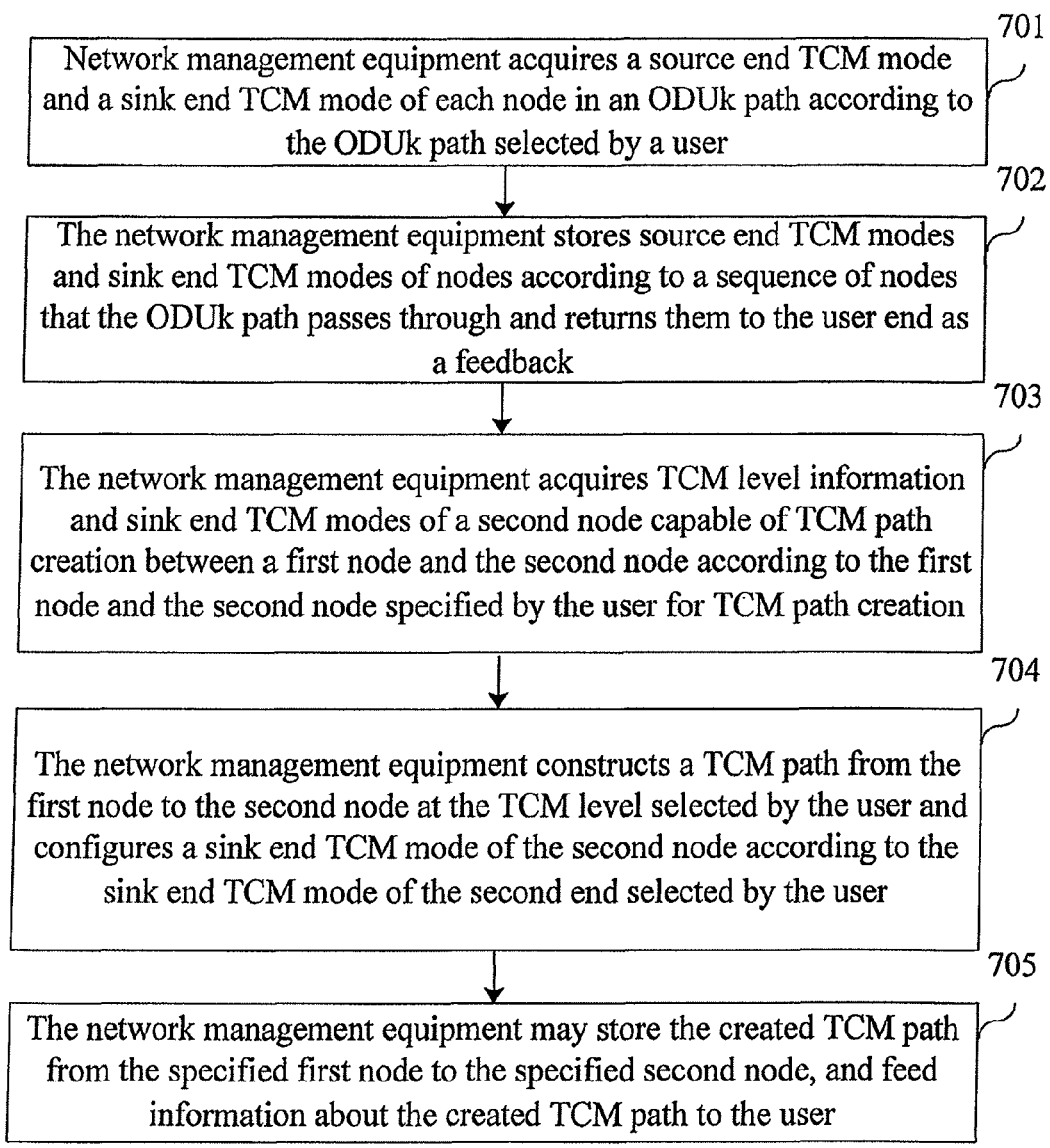
FIG. 7 is a schematic flow chart of a TCM path creation method according to a second embodiment of the present invention.

FIG. 7 is a schematic flow chart of a TCM path creation method according to a second embodiment of the present invention. In the TCM path creation, first, a user is required to specify a start node and a termination node for the TCM path creation, where the start node is the first node described in this embodiment, and the termination node is the second node described in this embodiment. Network management equipment acquires OH information of each node and then calculates and acquires a TCM path according to conditions that a TCM path should have (for example, TCM modes that each node in the TCM path should have, an available TCM level, and other information). During the procedure, all available TCM levels and configurable sink end TCM modes of the specified termination node at the levels, for example, the OPERATIONAL mode or the MONITOR mode, or only the MONITOR mode, may be listed. The TCM path between the specified start node and termination node acquired by the calculation method does not influence TCM paths that already exist. As shown in FIG. 7, the TCM path creation method may specifically include the following steps.

In step 701, network management equipment acquires the source end TCM mode and the sink end TCM mode of each node in an ODUk path according to the ODUk path selected by a user.

In step 702, the network management equipment stores source end TCM modes and sink end TCM modes of nodes according to a sequence of the nodes that the ODUk path passes through and returns them to the user end as a feedback.

Acquired TCM mode information is stored in a certain data sheet according to a sequence of the nodes that the ODUk path passes through, and the source end TCM mode and the sink end TCM mode need to be respectively stored for the same node.

In step 703, the network management equipment acquires TCM level information and sink end TCM modes of a second node capable of TCM path creation between a first node and the second node according to the first node and the second node specified by the user for TCM path creation.

The acquisition of the TCM level information and the sink end TCM modes of the second node capable of TCM path creation the between the first node and the second node by the network management equipment through calculation may have the following possibilities. First, the network management equipment traverses all nodes of the ODUk path at all TCM levels according to a sequence of the nodes that the ODUk path passes through.

According to TCM modes that a start node and a termination node in a TCM path should have (that is, a source end of the start node should be in the OPERATIONAL mode, and a sink end of the termination node should be in the OPERATIONAL mode or the MONITOR mode) and TCM modes that intermediate nodes between the start node and the termination node in the TCM path should have (that is, source end and sink end TCM modes of the intermediate nodes are both the TRANSPARENT mode), when the source end TCM mode of the specified first node traversed at a certain TCM level is the TRANSPARENT mode, the source end TCM mode and the sink end TCM mode of nodes between the first node and the second node that are traversed in turn are both the TRANSPARENT mode, and the sink end TCM mode of the specified second node traversed is also the TRANSPARENT mode, it indicates that a TCM path may be created between the first node and the second node at this TCM level, and TCM modes of each node in the TCM path are configured while the path is created successfully in the following steps.

When the source end TCM mode of the specified first node traversed at a certain TCM level is the OPERATIONAL mode, the source end TCM mode of nodes between the first node and the second node that are traversed in turn is the TRANSPARENT mode, the sink end TCM mode of the nodes between the first and the second node that are traversed in turn is the TRANSPARENT mode or the MONITOR mode, and the source end TCM mode of the specified second node traversed is the TRANSPARENT mode, and the sink end TCM mode of the specified second node traversed is also the TRANSPARENT mode, a TCM path may also be created between the first node and the second node at this TCM level, and TCM modes of each node in the TCM path are configured while the path is created successfully in the following steps.

In step 704, according to TCM level information and the sink end TCM mode of the second end for TCM path creation that are selected by the user, the network management equipment constructs a TCM path from the first node to the second node at the TCM level selected by the user and configures the sink end TCM mode of the second node according to the sink end TCM mode of the second end selected by the user.

In step 703, the network management equipment calculates and acquires all TCM level information and sink end TCM modes of the second node capable of creating a TCM path successfully according to the first node and the second node specified by the user, and then in step 704, the network management equipment creates a TCM path from the first node to the second node according to a TCM level and the TCM mode of the second node that are selected by the user from all the TCM level information and sink end TCM modes of the second node capable of creating a TCM path.

In step 704, after the TCM path creation at a certain TCM level is successful, it indicates that the TCM path at this level can be used for TCM monitoring, and the sink end TCM mode of the second node may be configured as the OPERATIONAL mode or the MONITOR mode when using the TCM path at this level for monitoring.

Besides, the configuration of the sink end TCM mode of the second node as the OPERATIONAL mode or the MONITOR mode is limited by a certain condition. If the source end TCM mode of the specified first node is the OPERATIONAL mode, after a TCM path from the specified first node to the specified second node is created successfully, if the network management equipment finds through search that sink end TCM modes of all nodes after the specified second node are all the TRANSPARENT mode, the sink end TCM mode of the specified second node may be configured as the OPERATIONAL mode or the MONITOR mode; and if the network management equipment searches out a node whose sink end TCM mode being the OPERATIONAL mode or the MONITOR mode in the nodes after the specified second node, the sink end TCM mode of the specified second node can only be configured as the MONITOR mode.

In step 705, the network management equipment may store the created TCM path from the specified first node to the specified second node, and return information about the created TCM path to the user as a feedback.

In the TCM path creation method provided in this embodiment, TCM OH is configured for each node through the path creation function; currently existing TCM paths can be determined clearly and applicable TCM OH and level information can be obtained by using the path creation function. After a TCM level is specified and the creation of a TCM path is determined, the network management equipment can acquire OH configuration that may be set for the first node, the second node, and nodes between the two nodes, and can actually configure the OH to the nodes, which avoids unnecessary trouble caused by mis-configuration of the user in direct operation. The path creation determines which level of TCM OH can be used to monitor a TCM segment for the specified first node and second node and how to configure OH of the TCM segment according to searched out information of each node in the ODUk path, thereby providing reliable and efficient path management.

Figure 8:
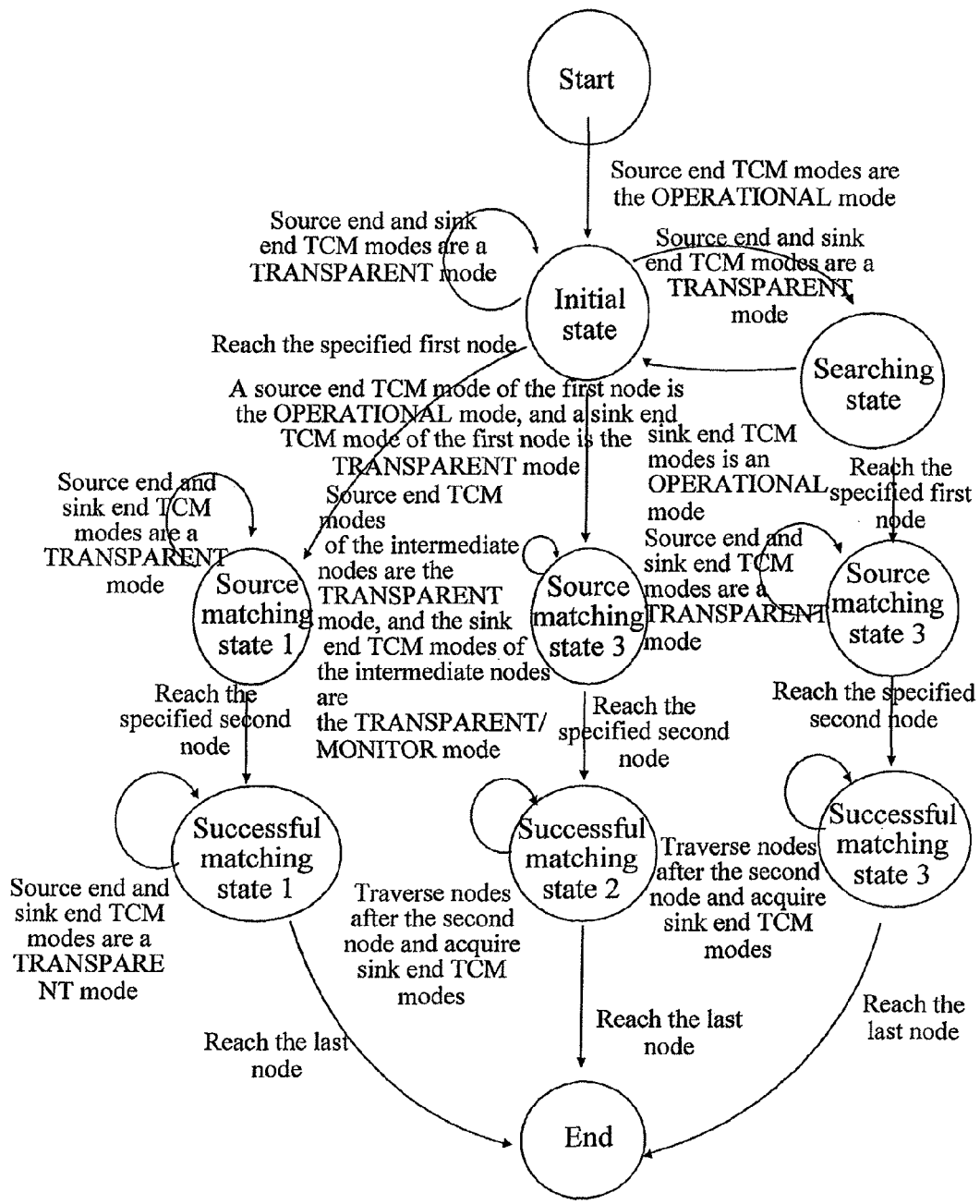
FIG. 8 is a schematic view of state transition of a TCM path creation method according to a third embodiment of the present invention.

In order to explain the above TCM path creation method more comprehensively, an embodiment of the present invention is illustrated with a visual state transition view. FIG. 8 is a schematic view of state transition of a TCM path creation method according to a third embodiment of the present invention. FIG. 8 only marks transition relations of a normal path; in practice, some transitions not shown in FIG. 8 may occur due to the misoperation of the user end, and in this case, a TCM path cannot be created. Besides, in FIG. 8, each circle denotes some state information in the process of TCM path creation which may include initial, searching, source matching, successful matching, and end states, the pointing direction of each arrow denotes transition between the states, and identifying information of each arrow denotes conditions required for state transition. For example, all available TCM OH information at one of TCM levels can be obtained by traversing the level. FIG. 8 is described specifically below.

First, a user is required to specify a start node and a termination node of a TCM path to be created, that is, the specified first node and the specified second node described in the embodiment of the present invention. Then, nodes in an ODUk path at each TCM level are calculated by network management equipment, so as to determine whether a TCM path can be created between the first node and the second node, where processing at each level is independent.

FIG. 8 shows three source matching states 1, 2, and 3, which form three main matching routes capable of creating TCM paths in path creation. The creation of a TCM path through the three states is illustrated in detail below.

A TCM path is created through the source matching state 1. The case is that no TCM path exists in a certain ODUk path, and TCM modes of source ends and sink ends of all nodes in the ODUk path are not configured, that is, source end TCM modes and sink end TCM modes of all nodes are the TRANSPARENT mode. Then, in an initial state, nodes in the ODUk path are traversed in turn from the first node in the ODUk path, when the specified first node is traversed, the state transits to the source matching state 1 according to a leftmost matching route shown in FIG. 8, intermediate nodes between the specified first node and second node are traversed in the source matching state 1, source end and sink end TCM modes of the intermediate nodes are all the TRANSPARENT mode in this state, when the specified second node is traversed, the state transits from the source matching state 1 to a successful matching state 1, it indicates that a TCM path can be created between the specified first node and second node and this level of OH can be used for route monitoring according to acquired TCM mode information of nodes through traversal of the network management equipment. Besides, in the successful matching state 1, nodes after the specified second node are traversed until the last node in the ODUk path is traversed, and the state transits to an end state. Source end and sink end TCM modes of all the nodes after the specified second node are all the TRANSPARENT mode, and thus the sink end TCM mode of the specified second node may be configured as the OPERATIONAL mode or the MONITOR mode. Up to now, a TCM path can be created successfully.

A TCM path is created through the source matching state 2. The case is that a TCM path already exists in an ODUk path, and source end TCM modes and sink end TCM modes of nodes before the specified first node are all the TRANSPARENT mode. Then, in the initial state, the nodes before the specified first node are traversed in turn until the specified first node is traversed. If the source end TCM mode of the first node is the OPERATIONAL mode, and the sink end TCM mode of the first node is the TRANSPARENT mode, the state may transit from the initial state to the source matching state 2. In the source matching state 2, the intermediate nodes between the specified first node and second node are traversed, if a node whose source end TCM mode being the OPERATIONAL mode exists between the first node and the second node, the matching fails, that is, the traversal of the network management equipment will not reach the specified second node, the TCM path creation is not successful, and this case is not shown in FIG. 8; if the source end TCM modes of all the intermediate nodes between the first node and the second node are the TRANSPARENT mode, and the sink end TCM modes of all the intermediate nodes between the first node and the second node are the TRANSPARENT mode or the MONITOR mode, the state transits from the source matching state 2 to a successful matching state 2 when the traversal reaches the specified second node in the source matching state 2, which indicates that a TCM path can be created between the specified first node and second node according to acquired TCM mode information of nodes through the traversal of the network management equipment. However, the mode that the sink end TCM mode of the second node can be configured as cannot be determined at this time, which further depends on sink end TCM modes of nodes after the second node. Then, the nodes after the specified second node are traversed in the successful matching state 2, if the sink end TCM modes of all the nodes after the specified second node are all the TRANSPARENT mode, the sink end TCM mode of the specified second node may be configured as the MONITOR mode or the OPERATIONAL mode; if a node whose sink end TCM mode being the MONITOR mode or the OPERATIONAL mode exists in the nodes traversed after the specified second node, the sink end TCM mode of the specified second node can only be configured as the MONITOR mode. This case indicates that the created TCM path may be partially overlapped with currently existing TCM paths. When the nodes after the specified second node are traversed in the successful matching state 2, the state transits from the successful matching state 2 to the end state when the last node in the ODUk path or a node whose sink end TCM mode being the MONITOR mode or the OPERATIONAL mode in the ODUk path is traversed, and the operation ends. Up to now, a TCM path has been created successfully.

A TCM path is created through a source matching state 3. The case is that a TCM path already exists in an ODUk path, and source end TCM modes of nodes before the specified first node are the OPERATIONAL mode. Then, in the initial state, the nodes before the specified first node are traversed in turn, and when a node whose source end TCM mode being the OPERATIONAL mode is traversed, the state transits from the initial state to a searching state. In one case, traversal is continued on subsequent nodes in the searching state, when the specified first node is traversed, the state transits from the searching state to the source matching state 3; in the source matching state 3, traversal is continued on intermediate nodes between the specified first node and second node according to a sequence of nodes, under the condition that source end TCM modes and sink end TCM modes of the intermediate nodes are all the TRANSPARENT mode, the state transits from the source matching state 3 to a successful matching state 3 when the specified second node is traversed. At this time, a TCM path can be created between the specified first node and second node. If the source end TCM mode of the specified first node is the TRANSPARENT mode, the source end TCM mode of the specified first node is configured as the OPERATIONAL mode after the TCM path is created. The sink end TCM mode of the second node in the TCM path is dependent upon sink end TCM modes of nodes after the second node; then, traversal is continued on nodes after the specified second node in the successful matching state 3, if the sink end TCM modes of all the nodes after the specified second node are all the TRANSPARENT mode, the sink end TCM mode of the specified second node may be configured as the MONITOR mode or the OPERATIONAL mode; and if a node whose sink end TCM mode being the MONITOR mode or the OPERATIONAL mode exists in the nodes traversed after the specified second node, the sink end TCM mode of the specified second node can only be configured as the MONITOR mode. This case indicates that the created TCM path may be partially overlapped with currently existing TCM paths. When the nodes after the specified second node are traversed in the successful matching state 3, the state transits from the successful matching state 3 to the end state when the last node in the ODUk path is traversed, and the operation ends. Up to now, a TCM path has been created successfully.

In the other case, if a node whose source end TCM mode being the TRANSPARENT mode and sink end TCM mode being the OPERATIONAL mode still exists between a node whose source end TCM mode being the OPERATIONAL mode and the specified first node, it indicates that a complete TCM path occurs before traversal in the searching state reaches the specified first node, then the state transits from the searching state back to the initial state, and in the initial state, which matching route to take, that is, to the source matching state 1, the source matching state 2, or the searching state, is decided according to source end TCM modes of the nodes before the specified first node that are traversed or the source end TCM mode of the specified first node traversed. The specific operation process will not be described again.

In addition to the above cases of successful matching shown in FIG. 8, if transition cannot be performed according to the states shown in FIG. 8, it indicates that a monitoring path between nodes specified by the user cannot be formed by using this level of OH.

Figure 9:
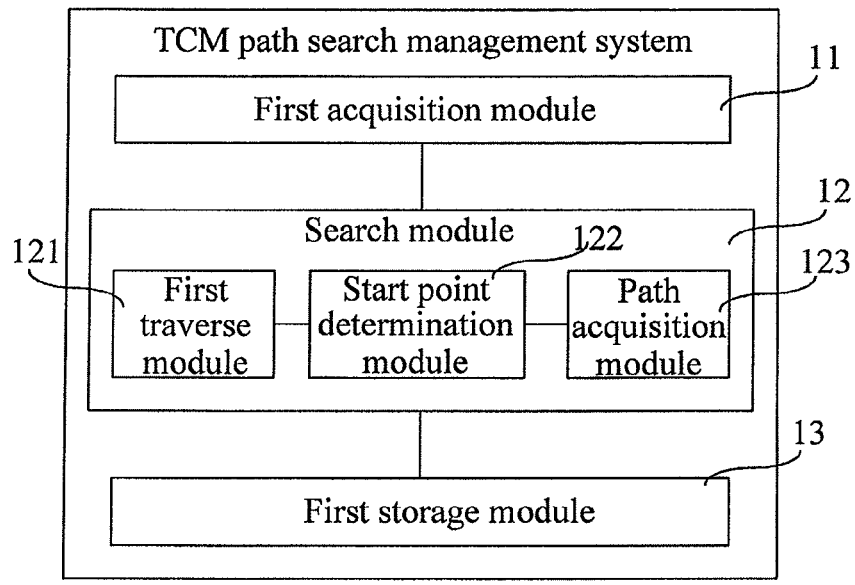
FIG. 9 is a schematic structural view of a TCM path search management system according to an embodiment of the present invention.

FIG. 9 is a schematic structural view of a TCM path search management system according to an embodiment of the present invention. TCM path management includes path search management, path creation management, path deletion management, and bi-directional ODUk path management. The function of "TCM path deletion" performed by the path deletion management is simple, and thus will not be described in detail in the embodiment of the present invention although it also belongs to a part of the TCM path management. Besides, in actual service scenarios, an ODUk path may be bi-directional or unidirectional, but the bi-directional ODUk path can always be processed as two unidirectional ODUk paths. Therefore, the creation of a TCM path based on a bi-directional ODUk path may be processed in processing directions of two unidirectional ODUk paths respectively.

The TCM path search management system may include: a first acquisition module 11, configured to acquire the source end TCM mode and the sink end TCM mode at a single level of each node in an ODUk path; and a search module 12, configured to calculate a TCM path between nodes in the ODUk path according to the source end TCM mode and the sink end TCM mode at the single level of each node that are acquired by the first acquisition module 11. The search module 12 may include: a first traverse module 121, configured to traverse the source end TCM mode and the sink end TCM mode at the single level of each node that are stored according to a sequence of nodes that the ODUk path passes through; a start point determination module 122, configured to determine a first node whose source end TCM mode being the OPERATIONAL mode as a start point of a TCM path at the single level between nodes in the ODUk path when the first traverse module 121 traverses the node; and a path acquisition module 123, configured to acquire a TCM path at the single level between nodes in the ODUk path from the first node whose source end TCM mode being the OPERATIONAL mode to a first node whose sink end TCM mode being the OPERATIONAL mode or the MONITOR mode when the first traverse module 121 traverses the first node whose sink end TCM mode being the OPERATIONAL mode or the MONITOR mode. The TCM path may be "terminated" or not "terminated."

The path search management system may further include a first storage module 13, which is configured to store source end TCM modes and sink end TCM modes of nodes according to the sequence of the nodes that the ODUk path passes through.

The TCM path search management system provided in this embodiment can acquire a complete TCM path by performing TCM path search through TCM OH node information configured at a single station through the above modules, so as to determine a currently monitored TCM segment, thereby realizing efficient path management in complex TCM paths that can be nested, overlapped and/or cascaded, and avoiding unnecessary trouble caused by misoperation of the user.

Figure 10:
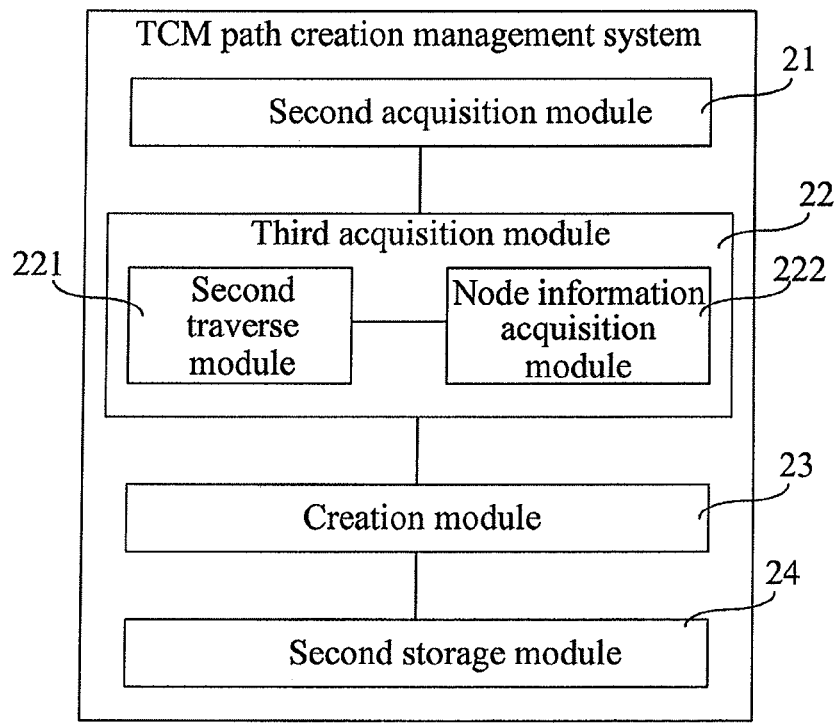
FIG. 10 is a schematic structural view of a TCM path creation management system according to an embodiment of the present invention.

FIG. 10 is a schematic structural view of a TCM path creation management system according to an embodiment of the present invention. The path creation system may include: a second acquisition module 21, configured to acquire the source end TCM mode and the sink end TCM mode of each node in an ODUk path; a third acquisition module 22, configured to acquire TCM level information and the sink end TCM mode of a second node for TCM path creation between a first node and the second node according to the first node and second node that are specified; and a creation module 23, configured to create, according to the TCM level information and the sink end TCM mode of the second node that are acquired, a TCM path between the first node and second node that are specified.

The third acquisition module 22 may include: a second traverse module 221, configured to traverse all nodes of the ODUk path at all TCM levels according to the first node and the second node specified by a user end for TCM path creation according to a sequence of nodes that the ODUk path passes through; and a node information acquisition module 222, configured to indicate that a TCM path can be created between the first node and the second node at a TCM level when the source end TCM mode of the specified first node traversed at the TCM level is the TRANSPARENT mode, source end TCM modes and sink end TCM modes of nodes between the first node and the second node that are traversed in turn are the TRANSPARENT mode, or the source end TCM modes are the TRANSPARENT mode and the sink end TCM modes are the TRANSPARENT mode or a MONITOR mode, and the sink end TCM mode of the second node traversed is also the TRANSPARENT mode. If the source end TCM modes and the sink end TCM modes of the nodes between the first node and the second node are all the TRANSPARENT mode, the sink end TCM mode of the specified second node may be configured as an OPERATIONAL mode or the MONITOR mode; if the source end TCM modes of the intermediate nodes are the TRANSPARENT mode and the sink end TCM modes of the intermediate nodes are the TRANSPARENT mode or the MONITOR mode, sink end TCM modes of nodes after the specified second node still need to be considered, and if the sink end TCM modes of the nodes after the specified second node are all the TRANSPARENT mode, the sink end TCM mode of the specified second node is configured as the OPERATIONAL mode or the MONITOR mode; if the sink end TCM modes of the nodes after the specified second node are the OPERATIONAL mode or the MONITOR mode, the sink end TCM mode of the specified second node is configured as the MONITOR mode.

The TCM path creation management system further includes a second storage module 24, which is configured to store source end TCM modes and sink end TCM modes of nodes according to the sequence of the nodes that the ODUk path passes through.

In the TCM path creation management system provided in this embodiment, TCM OH is configured for each node through the path creation function; currently existing TCM paths can be determined clearly and applicable TCM OH and level information can be obtained by using the path creation function. After a TCM level is specified and the creation of a TCM path is determined, settable OH configuration for the first node, the second node, and nodes between the two nodes can be acquired, and OH can be actually configured for the single-station nodes, which avoids unnecessary trouble caused by misoperation of the user. The path creation determines which level of TCM OH can be used to monitor a TCM segment for the specified first node and second node and how to configure the TCM segment according to searched out path information. In this way, reliable and efficient path management is provided.

It should be noted that, the above embodiments are merely provided for elaborating the technical solutions of the present invention, but not intended to limit the present invention. Although the present invention has been described in detail with reference to the foregoing embodiments, it is apparent that those skilled in the art can make various modifications or equivalent replacements to the technical solutions of the invention without departing from the spirit and scope of the invention. Any modification, equivalent replacement, or improvement made without departing from the spirit and principle of the present invention should fall within the scope of the present invention.

What is claimed is:

1. A Tandem connection monitoring (TCM) path search method, comprising:
    acquiring the source end TCM mode and the sink end TCM mode at a single level of each node in an Optical Channel Data Unit-k (ODUk) path;
    storing the source end TCM modes and the sink end TCM modes of the nodes according to a sequence of nodes that the ODUk path passes through; and
    calculating a TCM path at a single level between nodes in the ODUk path according to the source end TCM mode and the sink end TCM mode at the single level of each node that are acquired, wherein the calculating comprising:
        traversing source end TCM modes and sink end TCM modes of all nodes at the single level of the ODUk path according to the sequence of the nodes that the ODUk path passes through, and when traversing a first node whose source end TCM mode being the OPERATIONAL mode, determining the node as a start point of the TCM path at the single level between the nodes in the ODUk path;
        continuing to traverse nodes after the first node whose source end TCM mode being the OPERATIONAL mode according to the sequence of the nodes that the ODUk path passes through; wherein when traversing a first node whose sink end TCM mode being the OPERATIONAL mode or the MONITOR mode, acquiring a TCM path at the single level between the nodes in the ODUk path from the first node whose source end TCM mode being the OPERATIONAL mode to the first node whose sink end TCM mode being the OPERATIONAL mode or the MONITOR mode.

2. A Tandem connection monitoring (TCM) path creation method, comprising:
    acquiring the source end TCM mode and the sink end TCM mode of each node in an Optical Channel Data Unit-k (ODUk) path;
    acquiring TCM level information and the sink end TCM mode of a second node for TCM path creation between a first node and the second node according to the first node and the second node that are specified;
    storing source end TCM modes and sink end TCM modes of the nodes according to a sequence of nodes that the ODUk path passes through, and returning the source end TCM modes and the sink end TCM modes of the nodes to a user end as a feedback; and
    creating, according to the TCM level information and the sink end TCM mode of the second node that are acquired, a TCM path between the first node and second node that are specified, wherein the calculating comprising:
        traversing all nodes of the ODUk path at all TCM levels according to the first node and the second node specified by the user end for creating the TCM path based on the sequence of the nodes that the ODUk path passes through; and
        when the source end TCM mode of the specified first node traversed at a TCM level is the TRANSPARENT mode, source end TCM modes and sink end TCM modes of nodes between the first node and the second node that are traversed in turn are all the TRANSPARENT mode, and the sink end TCM mode of the specified second node traversed is also the TRANSPARENT mode, indicating that the TCM path is capable of being created between the first node and the second node at the TCM level.

3. The method according to claim 2, wherein the acquiring the TCM level information and the sink end TCM mode of the second node for TCM path creation between the first node and the second node comprises:
    traversing all nodes of the ODUk path at all TCM levels according to the sequence of the nodes that the ODUk path passes through; and
    when the source end TCM mode of the specified first node traversed at a TCM level is the OPERATIONAL mode, source end TCM modes of nodes between the first node and the second node that are traversed in turn is the TRANSPARENT mode, and sink end TCM modes of the nodes between the first and the second node that are traversed in turn is the TRANSPARENT mode or the MONITOR mode, and the sink end TCM mode of the specified second node traversed is also the TRANSPARENT mode, indicating that the TCM path is capable of being created between the first node and the second node at the TCM level.

4. The method according to claim 2, wherein the sink end TCM mode of the specified second node is able to be configured as the OPERATIONAL mode or the MONITOR mode.

5. The method according to claim 4, wherein the configuring the sink end TCM mode of the specified second node as the OPERATIONAL mode or the MONITOR mode is: if sink end TCM modes of nodes after the specified second node are all the TRANSPARENT mode, configuring the sink end TCM mode of the specified second node as the OPERATIONAL mode or the MONITOR mode; and if the sink end TCM modes of the nodes after the specified second node are the OPERATIONAL mode or the MONITOR mode, configuring the sink end TCM mode of the specified second node as the MONITOR mode.

6. A Tandem connection monitoring (TCM) path search management system, comprising one or more board:
    a first acquisition module on a board, configured to acquire a source end TCM mode and a sink end TCM mode at a single level of each node in an Optical Channel Data Unit-k (ODUk) path;
    a search module on the board, configured to calculate the TCM path between nodes in the ODUk path according to the source end TCM mode and the sink end TCM mode at the single level of each node that are acquired by the first acquisition module, wherein the search module comprises:
        a first traverse module on the board, configured to traverse the source end TCM mode and the sink end TCM mode at the single level of each node that are stored according to a sequence of nodes that the ODUk path passes through;
        a start point determination module on the board, configured to determine a first node whose source end TCM mode being an OPERATIONAL mode as a start point of a TCM path at the single level between nodes in the ODUk path when the first traverse module traverses the first node whose source end TCM mode being the OPERATIONAL mode; and
        a path acquisition module on the board, configured to acquire a TCM path at the single level between nodes in the ODUk path from the first node whose source end TCM mode being the OPERATIONAL mode to a first node whose sink end TCM mode being the OPERATIONAL mode or the MONITOR mode when the first traverse module traverses the first node whose sink end TCM mode being the OPERATIONAL mode or the MONITOR mode.

7. The system according to claim 6, wherein the path search management system further comprises:
   a first storage module on the board, configured to store source end TCM modes and sink end TCM modes of the nodes according to the sequence of the nodes that the ODUk path passes through.

8. A Tandem connection monitoring (TCM) path creation management system, comprising:
   a second acquisition module on the board, configured to acquire the source end TCM mode and the sink end TCM mode of each node in an Optical Channel Data Unit-k (ODUk) path;
   a third acquisition module on the board, configured to acquire TCM level information and the sink end TCM mode of a second node for TCM path creation between a first node and the second node according to the first node and second node that are specified; and
   a creation module on the board, configured to create, according to the TCM level information and the sink end TCM mode of the second node that are acquired, a TCM path between the first node and second node that are specified, wherein the third acquisition module comprises:
   a second traverse module on the board, configured to traverse all nodes of the ODUk path at all TCM levels according to the first node and the second node specified by a user end for creating the TCM path and according to a sequence of nodes that the ODUk path passes through; and
   a node information acquisition module on the board, configured to indicate that the TCM path is capable of being created between the first node and the second node at a TCM level when the source end TCM mode of the specified first node traversed at the TCM level is the TRANSPARENT mode, source end TCM modes and sink end TCM modes of nodes between the first node and the second node that are traversed in turn are all the TRANSPARENT mode, or the source end TCM modes are the TRANSPARENT mode and the sink end TCM modes are the TRANSPARENT mode or the MONITOR mode, and the sink end TCM mode of the second node traversed is also the TRANSPARENT mode.

9. The system according to claim 8, further comprising a second storage module on the board, configured to store source end TCM modes and sink end TCM modes of the nodes according to the sequence of the nodes that the ODUk path passes through.

* * * * *

UNITED STATES PATENT AND TRADEMARK OFFICE
CERTIFICATE OF CORRECTION

PATENT NO. : 8,976,686 B2  
APPLICATION NO. : 12/959104  
DATED : March 10, 2015  
INVENTOR(S) : Shujian Wang et al.

Page 1 of 1

It is certified that error appears in the above-identified patent and that said Letters Patent is hereby corrected as shown below:

On the Title Page, item (54) and in the Specification, col. 1, line 2, in the title, before "METHOD, PATH SEARCH", replace "CREAETION" with --CREATION--.

Signed and Sealed this
Fourteenth Day of July, 2015

Michelle K. Lee
*Director of the United States Patent and Trademark Office*